US007636557B2

(12) United States Patent
Klunk

(10) Patent No.: US 7,636,557 B2
(45) Date of Patent: Dec. 22, 2009

(54) IDENTIFYING RADIO STATIONS ALONG A TRAVEL ROUTE THAT BROADCAST SPECIFIED RADIO PROGRAM FORMATS

(76) Inventor: David Allen Klunk, 207 Reba Ct., Forest Hill, MD (US) 21050

( * ) Notice: Subject to any disclaimer, the term of this patent is extended or adjusted under 35 U.S.C. 154(b) by 586 days.

(21) Appl. No.: 11/513,220

(22) Filed: Aug. 31, 2006

(65) Prior Publication Data

US 2008/0057891 A1 Mar. 6, 2008

(51) Int. Cl.
*H04B 1/18* (2006.01)

(52) U.S. Cl. ................................ 455/186.1; 455/161.2

(58) Field of Classification Search ............. 455/186.1, 455/161.2, 414.3, 456.1; 701/1
See application file for complete search history.

(56) References Cited

U.S. PATENT DOCUMENTS 5,001,775 A 3/1991 Hayashi et al.
5,152,012 A 9/1992 Schwob
5,393,713 A 2/1995 Schwob
6,112,063 A 8/2000 Ravi et al.
6,282,412 B1 * 8/2001 Lyons ..................... 455/186.1
6,600,982 B1 7/2003 Cragun
6,778,808 B1 8/2004 Shimazu
6,799,201 B1 9/2004 Lee et al.
6,868,335 B2 3/2005 Obradovich et al.
6,876,856 B2 * 4/2005 Fattouch ..................... 455/446
6,924,748 B2 8/2005 Obradovich et al.
6,944,679 B2 9/2005 Parupudi et al.
6,992,619 B2 1/2006 Harrison
2003/0013425 A1 1/2003 Nee
2003/0032399 A1 * 2/2003 Slupe ...................... 455/161.2

(Continued)

FOREIGN PATENT DOCUMENTS

EP 0 964 514 A1 12/1999

(Continued)

OTHER PUBLICATIONS

Excerpt from website: www.radio-locator.com—dated Mar. 29, 2006, 2 pages.

(Continued)

*Primary Examiner*—Matthew D Anderson
*Assistant Examiner*—David Bilodeau
(74) *Attorney, Agent, or Firm*—Buchanan Ingersoll & Rooney PC

(57) ABSTRACT

Techniques are disclosed for identifying radio stations along a travel route broadcasting programs in user-specified radio program formats without requiring positioning devices that provide real-time positioning information of a radio receiver. An exemplary method includes determining a travel route based on specified starting and ending location information. The method includes identifying, from a plurality of radio stations, any radio stations along the determined travel route that broadcast radio program formats corresponding to at least one specified radio program format. The identifying includes analyzing predetermined radio station information compiled for the plurality of radio stations. The method includes outputting the identified radio stations to accompany the determined travel route as text-formatted travel directions comprising a plurality of text segments. The text segments specify at least one of the identified radio stations or indicate that none of the radio stations were identified, adjacent text segments that identify travel directions.

12 Claims, 6 Drawing Sheets

U.S. PATENT DOCUMENTS

| | | | | |
|---|---|---|---|---|
| 2003/0040272 | A1 | 2/2003 | Lelievre et al. | |
| 2004/0198282 | A1 | 10/2004 | Heiderscheit et al. | |
| 2004/0203729 | A1 | 10/2004 | Makipaa et al. | |
| 2004/0259557 | A1 | 12/2004 | Bey | |
| 2005/0020223 | A1 | 1/2005 | Ellis et al. | |
| 2005/0031100 | A1 | 2/2005 | Iggulden et al. | |
| 2005/0050201 | A1 | 3/2005 | Parupudi et al. | |
| 2005/0209774 | A1 | 9/2005 | Finlay | |
| 2005/0273251 | A1 | 12/2005 | Nix et al. | |
| 2005/0287971 | A1 * | 12/2005 | Christensen et al. ..... | 455/186.1 |

FOREIGN PATENT DOCUMENTS

| | | |
|---|---|---|
| GB | 2 373 655 A | 9/2002 |

OTHER PUBLICATIONS

Excerpt from website: maps.yahoo.com—dated Jul. 25, 2006, 1 page.

Excerpt from website: www. randmcnally.com—dated Jul. 25, 2006, 1 page.

Excerpt from website: www.mapquest.com—dated Jul. 25, 2006, 2 pages.

* cited by examiner

400

500

| Directions | Distance | Preferred Radio Station | Alternate Radio Station |
|---|---|---|---|
| Go Northeast on Reba Ct. towards Ross Rd. | <0.1 miles | 1 – 97.9 FM (WIYY) – Classic Rock | 8 – 92.5 FM (WXYZ) – Top 40 |
| Turn Right on Ross Rd. | 0.1 miles | " | " |
| Turn Left on Forest Valley Dr | 0.2 miles | " | " |
| Turn Right onto Rock Spring Rd. / MD-24 | 0.1 miles | " | " |
| Merge onto US-1 Bel Air Bypass towards Baltimore | 1.7 miles | " | 9 – 100.5 FM (WTPS) – Top 40 |
| Turn left onto MD-24 | <0.1 miles | " | " |
| Stay straight to go onto MD-24 South | 5.9 miles | " | " |
| Merge onto I-95 South towards Baltimore | 49.1 miles | " | " |
| Merge onto Capital Beltway / I-495 via exit 27 | 29.7 miles | 2 – 101.1 FM (DC101) – Classic Rock | 10 – 102.1 FM (WROC) – Classic Rock |
| Merge onto I-95 S via exit 57A toward Richmond | 86.1 miles | " | 11 – 107.2 FM (WQKX) – Classic Rock |
| Merge onto I-295 S via exit 84A toward Rocky Mt. | 43.2 miles | " | " |
| Take I-295 S exit on left toward I-95 S | 0.9 miles | " | " |
| Merge onto I-95 south | 214.1 miles | | |
| | Miles 1-25 of 214.1 | 3 – 104.5 FM (WXCX) – Classic Rock | 12 – 98.5 FM (WKRZ) – Classic Rock |
| | Miles 25-50 of 214.1 | 4 – 101.6 FM (WNOR) – Classic Rock | " |
| | Miles 50-64 of 214.1 | **NO STATION – *MUSIC STORE*** | 13 – 105.7 FM (WSRC) – Top 40 |
| | Miles 64-164 of 214.1 | 5 – 99.1 FM (WBBB) – Classic Rock | " |
| | Miles 164-214 of 214.1 | 6 – 104.6 FM (WXQR) – Classic Rock | " |
| Take the US-74 exit 14-towards Maxton | 0.2 miles | 6 – 104.6 FM (WXQR) – Classic Rock | 14 – 93.1 FM (WNOW) – Top 40 |
| Turn left onto US-74 East | 31.5 miles | 6 – 104.6 FM (WXQR) – Classic Rock | " |
| Take US-701 bypass S toward Whiteville | 0.2 miles | **NO STATION – *MUSIC STORE*** | " |
| Turn right onto US-701 bypass | 3.2 miles | **NO STATION – *MUSIC STORE*** | " |
| Turn left onto NC-130 | 14.1 miles | 7 – 96.5 FM (WXQR) – Classic Rock | 15 – 101.9 FM (WNCR) Classic Rock |
| End trip | | | |

FIG. 5

600

MUSIC STORE

Genre selected: Rock

Search by Artist [ ]

Search by Title [ ]

Active Rock National Airplay week ending 2/17/2006

| | Artist | Title | Total Plays | Add to Cart |
|---|---|---|---|---|
| 1. | Nickelback | Animals | 1451 | Buy |
| 2. | 10 Years | Wasteland | 1427 | Buy |
| 3. | Avenged Sevenfold | Bat Country | 1392 | Buy |
| 4. | Korn | Twisted Transistor | 1239 | Buy |
| 5. | Hinder | Get Stoned | 1235 | Buy |
| 6. | System of a Down | Hypnotize | 1213 | Buy |
| 7. | Seether | Truth | 1045 | Buy |
| 8. | Staind | Falling | 907 | Buy |
| 9. | Shinedown | Save Me | 865 | Buy |
| 10. | Disturbed | Just Stop | 834 | Buy |
| 11. | Disturbed | Stricken | 819 | Buy |
| 12. | Evans Blue | Cold (But I'm Still Here) | 811 | Buy |
| 13. | Mudvayne | Fall into Sleep | 795 | Buy |
| 14. | Thousand Foot Crutch | Move | 755 | Buy |
| 15. | Sevendust | Ugly | 681 | Buy |
| 16. | Audioslave | Out of Exile | 653 | Buy |
| 17. | P.O.D. | Goodbye for Now | 644 | Buy |
| 18. | Godsmack | Speak | 641 | Buy |
| 19. | Nine Inch Nails | Every Day is exactly the same | 640 | Buy |
| 20. | Trapt | Waiting | 611 | Buy |

View Next Twenty Artists/Titles

FIG. 6

IDENTIFYING RADIO STATIONS ALONG A TRAVEL ROUTE THAT BROADCAST SPECIFIED RADIO PROGRAM FORMATS

BACKGROUND

Customized radio systems can provide information on radio stations based on radio program format, but these systems require special equipment (e.g., European Patent Application No. EP0964514, UK Patent Application No. GB2373655, U.S. Pat. No. 6,992,619, and U.S. Patent Application Publication No. 2004/0198282, among others). For example, a common aspect of these customized radio systems is the need for special radio receivers that operate with positioning devices, such as GPS (Global Positioning System) receivers, which provide real-time positioning information of the radio receivers. These customized radio systems also need sufficient computing power to select radio stations according to combinations of location, radio signal strength, user preferences, etc. In other words, these customized radio systems are often unacceptable or unavailable to typical automobile travelers due to the expense and/or need to acquire such specialized equipment.

When travelers listen to the radio while driving long-distances in their automobiles, they must typically manually tune the radio to receive new stations as they drive in and out of radio station transmitter ranges along a travel route. Perhaps even more frustrating for travelers is trying to find new radio stations along the travel route that broadcast radio program formats that the travelers prefer, such as rock music, talk-sports, talk-news, etc. While on-line services, which generate maps and determine travel routes based on specified starting and ending location information (e.g., MapQuest, Rand McNally, Yahoo!, etc.), are available to help travelers plan travel routes, these services do not currently enable travelers to determine which radio stations along a determined travel route broadcast radio program formats that the travelers prefer.

SUMMARY

An exemplary method for identifying radio stations broadcasting along a travel route includes determining a travel route based on specified starting and ending location information and identifying, from a plurality of radio stations, any radio stations along the determined travel route that broadcast radio program formats corresponding to at least one specified radio program format. The identifying includes analyzing predetermined radio station information compiled for the plurality of radio stations. The method further includes outputting the identified radio stations to accompany the determined travel route as text-formatted travel directions comprising a plurality of text segments. The text segments specify at least one of the identified radio stations or indicate that none of the radio stations were identified, adjacent text segments that identify travel directions. The determining, analyzing and outputting steps are implemented without requiring positioning devices that provide real-time positioning information of a radio receiver. The text segments and text-formatted travel directions can be output to a printer or general purpose display device, such as a personal digital assistant (PDA), or mobile phone. The need for specialized radio equipment can thus be avoided by certain exemplary embodiments.

An exemplary system for identifying radio stations broadcasting along a travel route includes a trip mapping tool configured to determine a travel route based on specified starting and ending location information, and a radio station identification tool configured to identify, from a plurality of radio stations, any radio stations along the determined travel route that broadcast radio program formats corresponding to at least one specified radio program format by analyzing predetermined radio station information compiled for the plurality of radio stations. The trip mapping tool is configured to output the identified radio stations to accompany the determined travel route as text-formatted travel directions comprising a plurality of text segments. The text segments specify at least one of the identified radio stations or indicate that none of the radio stations were identified, adjacent text segments that identify travel directions. The trip mapping tool and the radio station identification tool are implemented without requiring positioning devices that generate real-time positioning information of a radio receiver.

BRIEF DESCRIPTION OF THE DRAWINGS

Other objects and advantages of the disclosure will become apparent to those skilled in the relevant art(s) upon reading the following detailed description of preferred embodiments, in conjunction with the accompanying drawings, in which like reference numerals have been used to designate like elements, and in which:

FIGS. 3-6 illustrate exemplary graphical user interfaces in accordance with systems and methods disclosed herein for identifying radio stations along a travel route that broadcast specified radio program formats.

DETAILED DESCRIPTION

Figure 1:
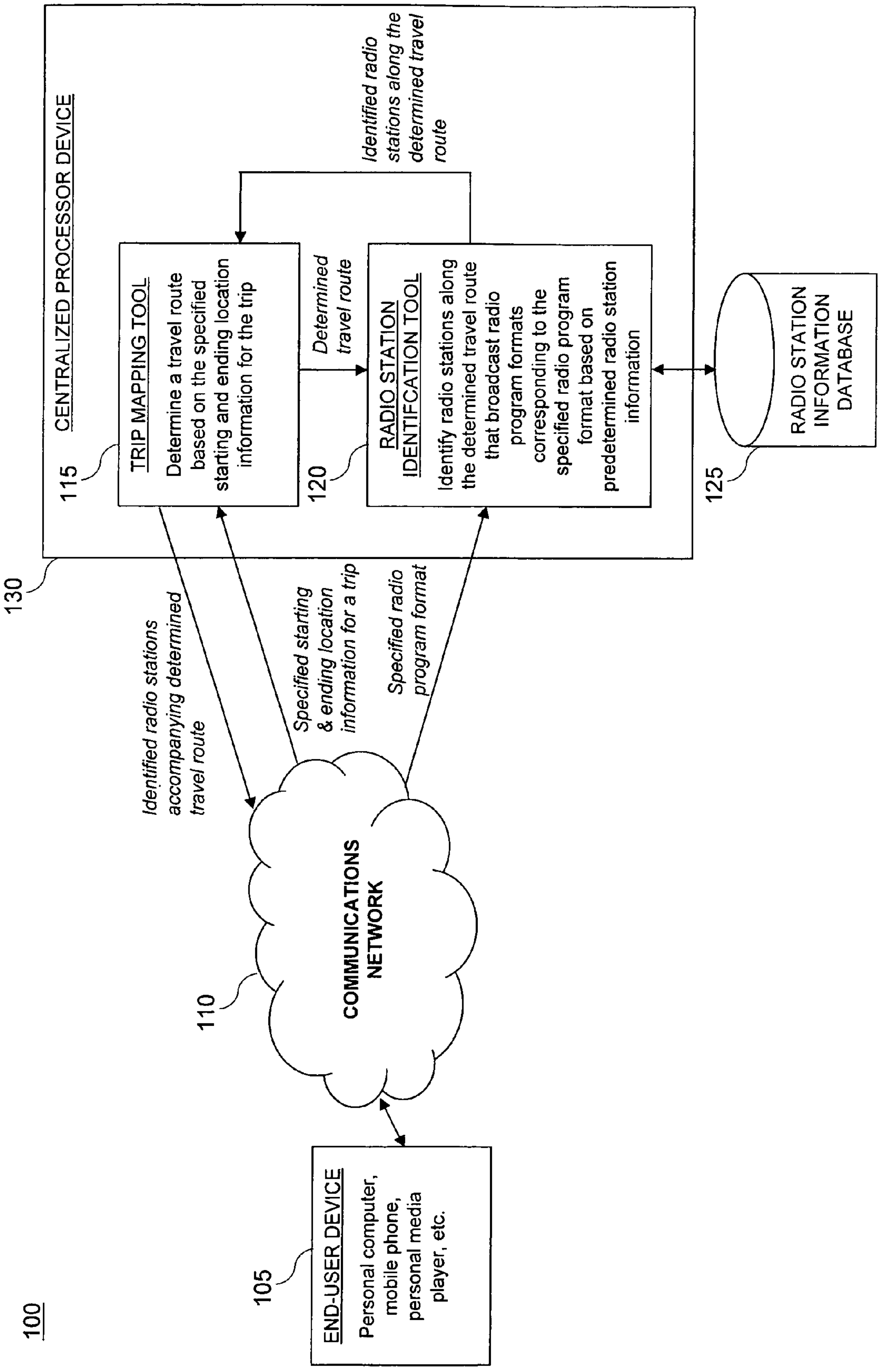
FIG. 1 illustrates an exemplary environment for identifying radio stations along a travel route that broadcast specified radio program formats.

FIG. 1 illustrates an exemplary environment 100 for identifying radio stations along a travel route that broadcast specified radio program formats. Exemplary environment 100 includes an end-user device 105, a communications network 110, a centralized processor device 130, which includes a trip mapping tool 115 and a radio station identification tool 120, and a radio station information database 125. The exemplary environment 100 is implemented without requiring positioning devices that provide real-time positioning information of a radio receiver.

Figure 3:
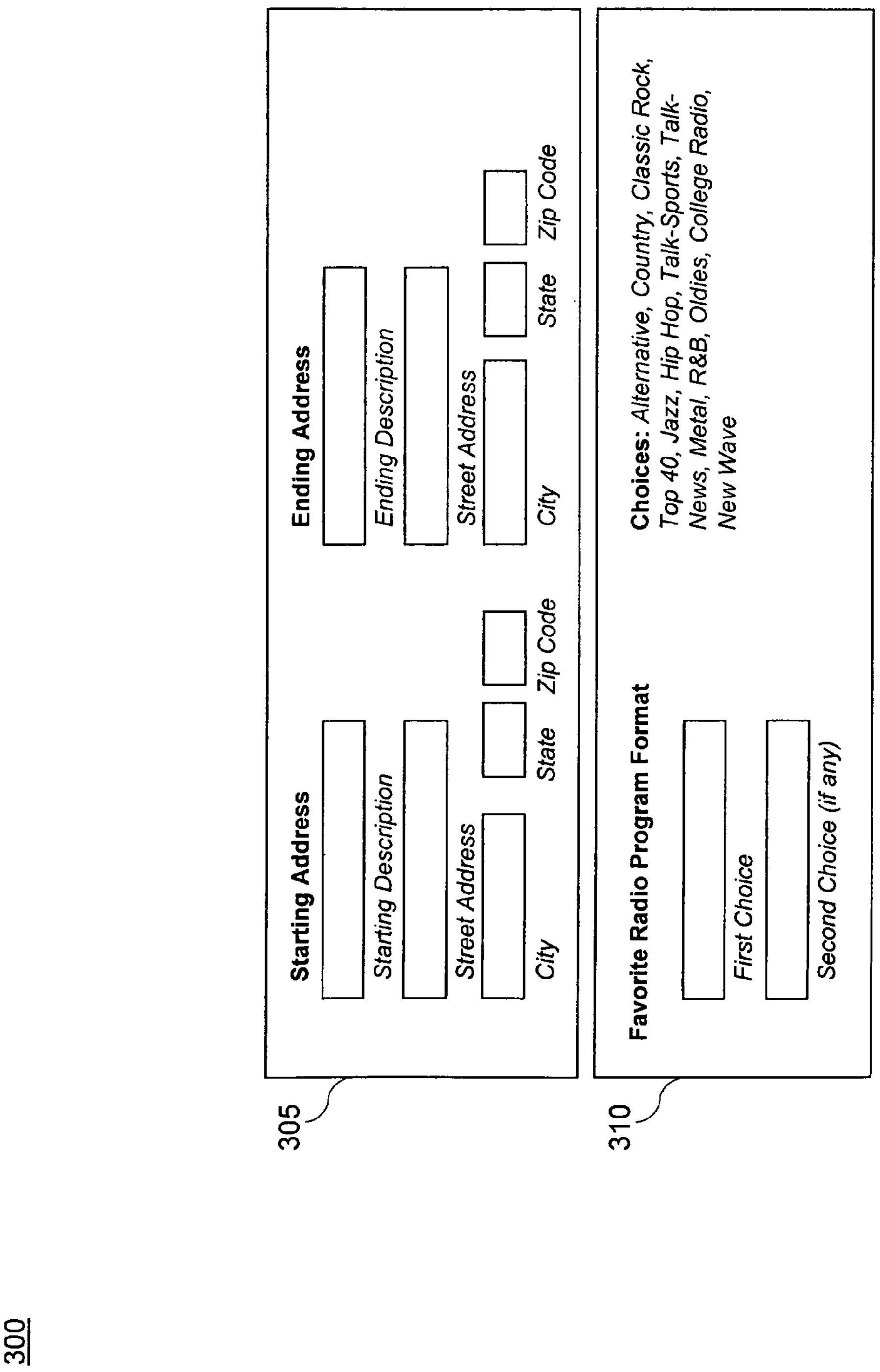

A user can access the trip mapping tool 115 and the radio station identification tool 120 via the end-user device 105. The end-user device 105 can be implemented as a personal computer, PDA (e.g., BlackBerry), mobile phone, or portable media player (e.g., iPod), among other devices. The end-user device 105 can be configured to access the centralized processor device 130 via the communications network 110. For example, FIG. 3 illustrates an exemplary graphical user interface 300 for accessing the trip mapping tool 115 and the radio station identification tool 120. The exemplary graphical user interface 300 includes a first dialog box 305 configured to enable the user to specify starting and ending location information for a trip. In this example, the user can enter a starting address and an ending address for the trip.

The exemplary graphical user interface 300 also includes a second dialog box 310 configured to enable the user to specify at least one radio program format from an exemplary menu of predefined radio program formats. The exemplary menu of predefined radio program formats shown in dialog box 310 includes alternative, country, classic rock, top 40, jazz, hip hop, talk-sports, talk-news, metal, R&B, oldies, college radio, and new wave formats, but could be configured to include other predetermined radio program formats. As shown in the embodiment of FIG. 3, the graphical user interface 300 can be configured to enable the user to rank the predefined radio program formats according to user preference (i.e., "first choice" and "second choice," etc.).

Those skilled in the relevant art(s) will understand that the graphical user interface 300 need not be limited to the configuration shown in FIG. 3, and can be implemented using various graphical user interface configurations, including pull-down menus and radio buttons, etc. for convenient selection of predefined starting and ending location information and radio program formats. In one implementation, the graphical user interface 300 can prompt the user to register for an account, so that the user's previous starting and ending location information and radio program format selections can be stored and recalled each time the user subsequently logs on to use the trip mapping tool 115 and the radio station identification tool 120.

As shown in the embodiment of FIG. 1, the trip mapping tool 115 and the radio station identification tool 120 can be implemented as an on-line software application(s) resident on the centralized processor device 130, which can be accessed by the user via the end-user device 105 and the communications network 110. In one embodiment, the trip mapping tool 115 and the radio station identification tool 120 can be implemented as a single, integrated software application. For example, the radio station identification tool 120 can be implemented as an additional feature of an existing on-line trip mapping service, such as, among other on-line trip mapping services, MapQuest (at www.mapquest.com), Rand McNally (at www.randmcnally.com), and Yahoo! (at maps.yahoo.com). In another embodiment, the trip mapping tool 115 and the radio station identification tool 120 can be implemented as separate software applications resident on the end-user device 105 or as an integrated software applications resident on the end-user device 105.

As shown in the embodiment of FIG. 1, inputs to the trip mapping tool 115 can include the starting and ending location information for a trip specified by the user and transmitted over the communications network 110. The trip mapping tool 115 can be configured to determine a travel route for the trip based on the specified starting and ending location information. For example, the trip mapping tool 115 might determine the fastest travel route and/or the shortest travel route, or the travel route that avoids highways, etc., in accordance with the user's preferences.

As shown in the embodiment of FIG. 1, inputs to the radio station identification tool 120 can include at least one radio station program format specified by the user and transmitted over the communications network 110, as well as the determined travel route generated by the trip mapping tool 115. The radio station identification tool 120 can also access predetermined radio station information compiled for a plurality of radio stations from the radio station information database 125. In this way, the radio station identification tool 120 can identify, from the plurality of radio stations, any radio stations along the determined travel route that broadcast radio program formats corresponding to the specified radio program format(s) by analyzing the radio station information stored in the radio station information database 125.

The radio station information database 125 can include predetermined radio station transmitter location information, radio station transmitter coverage area information, radio station program format information, and radio station programming restrictions information. The radio station identification tool 120 can analyze the radio station transmitter location information in conjunction with the radio station transmitter coverage area information to identify any radio stations that have transmitter coverage areas along the determined travel route. Then, by analyzing the radio station program format information, the radio station identification tool 120 can identify which of the radio stations having transmitter coverage areas along the determined travel route also broadcast radio program formats corresponding to the radio program format(s) specified by the user. The radio station identification tool 120 can also analyze the radio station programming restrictions information to further refine which radio stations should be identified along the determined travel route. For example, some radio stations might broadcast different radio program formats at different times during the day or on different days of the week. Other radio stations might change transmitter power at different times during the day or on different days of the week, thereby potentially affecting the transmitter coverage areas of the radio stations along the determined travel route.

Those skilled in the relevant art(s) will understand that other radio station information can be compiled and stored in the radio station information database 125. The radio station information can be compiled from public sources, such as Federal Communications Commission (FCC) licensing listings or other third party providers that compile such information, or by directly contacting radio stations for the information. In one implementation, the radio station information stored in the radio station database 125 can be periodically updated to reflect changes in the radio station information (e.g., new radio stations might be added or deleted, a radio station might change its format to broadcast a different radio program format, etc.).

The trip mapping tool 115 can be configured to output the identified radio stations generated by the radio station identification tool 120 to accompany the determined travel route as text-formatted travel directions, which comprise a plurality of text segments. In this context, text segments are human-readable characters conveying information about radio stations, such as broadcast frequency, call letters, format, geographical location (e.g., by home city), etc. The text segments can specify at least one of the identified radio stations, or indicate that none of the radio stations were identified, adjacent to text segments identifying travel directions.

FIG. 5 illustrates exemplary text-formatted travel directions 500, which comprise a plurality of text segments. In this example, a text segment 505 specifying the radio station "97.9 FM (WIYY)" appears adjacent to a text segment 510 specifying the travel directions "Go Northeast on Reba Ct. towards Ross Rd." In this way, the text-formatted travel directions 500 indicate that the radio station 97.9 FM has been identified as broadcasting the radio program format specified by the user and can be received along the determined travel route until the user reaches a travel direction 515, specifying "Merge onto Capital Beltway/I-495 via exit 27," at which point the user may tune the radio to "101.1 FM (DC101)," as specified by text segment 520 to continue to listen to a radio station broadcasting the user's preferred program format. Additional text segments can also be included in the text-formatted travel directions 500, such as text segment 525, which specifies a distance "<0.1 miles" for the travel direction 510. In some cases, different radio stations might be identified for different portions of a particular travel direction. For example, in the embodiment of FIG. 5, text segment 530 specifies the travel direction "Merge onto I-95 south" for 214.1 miles. Text segments 535 and 540 indicate that during miles 1-25 of the 214.1 mile stretch on I-95 south, a radio station "104.5 FM (WXCX)" has been identified, while text segments 555 and 560 indicate that during miles 25-50 of the 214.1 mile stretch on I-95 south, a radio station "101.6 FM (WNOR)" has been identified, etc.

In another embodiment, two or more radio stations broadcasting the user's preferred format, if available, can be listed as alternate options. For example, in the embodiment of FIG. 5, the user's preferred radio program format is classic rock. In this case, a "Preferred Radio Station" column 565 can identify classic rock radio stations, if any, that the user can listen to while driving along different driving segments of the travel route. If more than one classic rock radio station is identified along a given driving segment, then an "Alternate Radio Station" column 570 can identify an alternate classic rock radio station that the user can listen to along the given driving segment. In one implementation, the classic rock radio station that has the strongest broadcasting signal along the given driving segment might be identified as the "Preferred Radio Station," while the classic rock radio station having the second strongest broadcasting signal along the given driving segment might be identified as the "Alternate Radio Station." For example, in FIG. 5, column 565 identifies "101.1 FM (DC101)" in the radio station text segment 520 as the "Preferred Radio Station." and "102.1 FM (WROC)" in radio station text segment 580 as the "Alternate Radio Station" for the driving direction text segment 515 ("Merge onto Capital Beltway/I-495 via exit 27").

In a further embodiment, radio stations broadcasting programs in the user's secondary preferred format can be inserted when a radio station broadcasting in the user's first choice is not available along a given driving segment of the determined travel route. For example, in the embodiment of FIG. 5, the user's first choice radio program format is classic rock and the user's second choice radio program format is top 40. In this case, when a classic rock station is not identified for a given driving segment, then a top 40 station, if any, is identified for that driving segment. As shown in FIG. 5, column 565 identifies "97.9 FM (WIYY)," a classic rock station, in the radio station text segment 505 as the "Preferred Radio Station" and "92.5 FM (WXYZ)," a top 40 station, in radio station text segment 575 as the "Alternate Radio Station" for the driving direction text segment 510 ("Go Northeast on Reba Ct. towards Ross Rd.").

The trip mapping tool 115 can also be configured to indicate when no radio stations are identified for a particular segment of the determined travel route, and also to provide information about products that can be purchased by the user prior to travelling to fill in the gaps in radio coverage. For example, in the embodiment of FIG. 5, the radio station text segment 545 indicates that "NO STATION" has been identified for the adjacent driving direction text segment 550 "Take US-701 bypass S toward Whiteville." In this case, text segment 545 also includes a hypertext link to an on-line "Music Store" when the text is displayed on an interactive media. An on-line store can be configured to offer products that can be purchased by the user including, for example, compact discs, digital video discs, and/or downloadable multimedia files containing programs in the user-specified radio program format(s), as shown in the exemplary music store graphical user interface 600 illustrated in FIG. 6.

Figure 4:
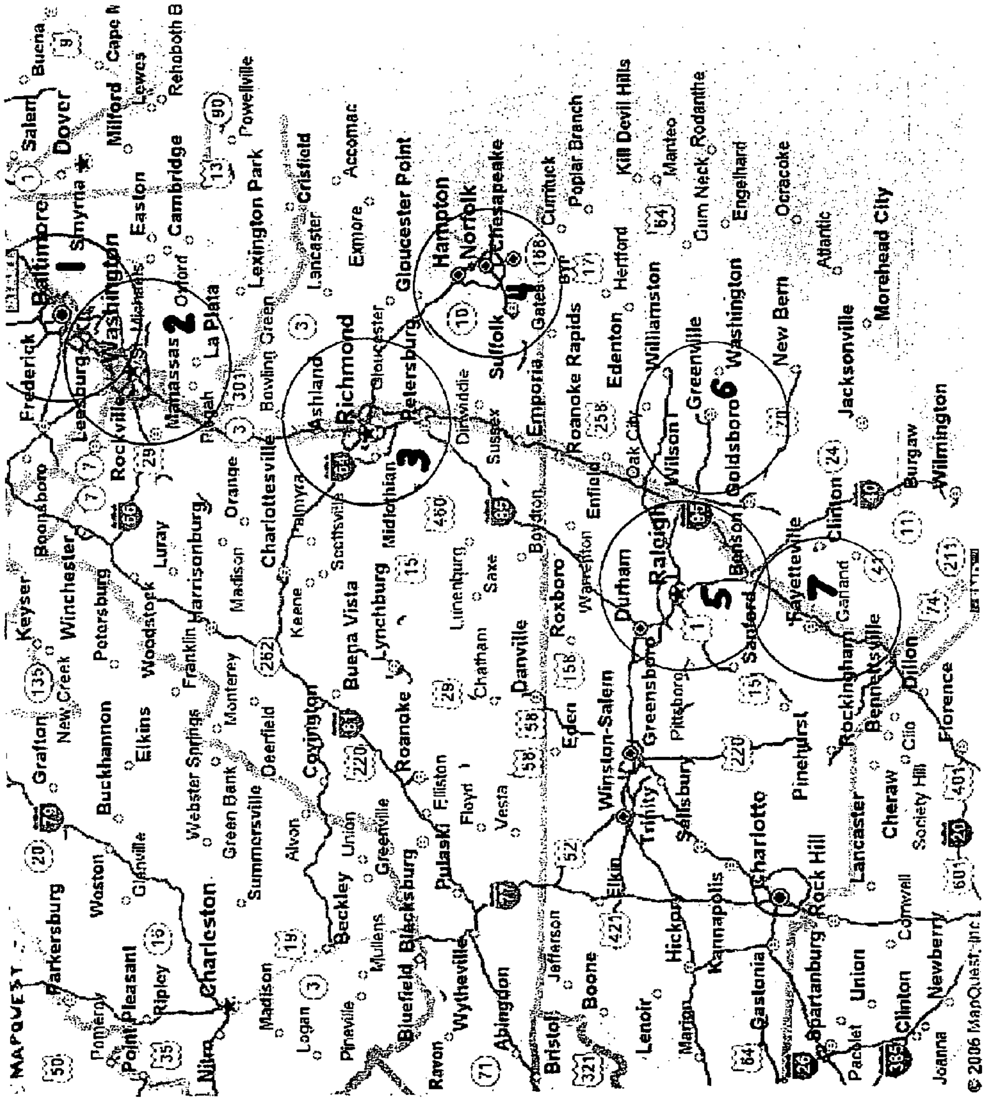

Optionally, the trip mapping tool 115 can be configured to output the identified radio stations to accompany the determined travel route as graphically-formatted travel directions. The identified radio stations can be represented on a map of the determined travel route based on predetermined transmitter location information and transmitter coverage area information for the identified radio stations. For example, FIG. 4 illustrates exemplary graphically-formatted travel directions 400, representing the seven "Preferred Radio Stations" identified in the exemplary text-formatted travel directions 500, illustrated in FIG. 5. In the embodiment of FIG. 4, circular transmitter coverage areas for the seven radio stations are superimposed on the map of the determined travel route. The underlying map was generated using the MapQuest service for this example. In the embodiment of FIG. 4, the circular transmitter coverage areas are centered on the transmitter locations for the identified radio stations, and the sizes of the circular transmitter coverage areas correspond to the predetermined transmitter coverage areas for the identified radio stations.

When implemented on an interactive device, the representations of the transmitter coverage areas can be graphical user interfaces (GUI), such that when a cursor is positioned over or when the user clicks on the GUI, information about the corresponding radio station can be displayed. The GUIs can be color coded or the like according to radio station format, for instance, so that a user can select radio stations along the travel route. In this case, the graphically-formatted travel directions can display the identified radio stations according to the user's preferences (i.e., first and second radio program format choices) or can display all of the identified radio stations along the travel route. The user can then select particular radio stations through the GUIs, so that the selected stations appear as text segments on text-formatted travel directions (such as those shown in the embodiment of FIG. 5), usually after updating.

Figure 2:
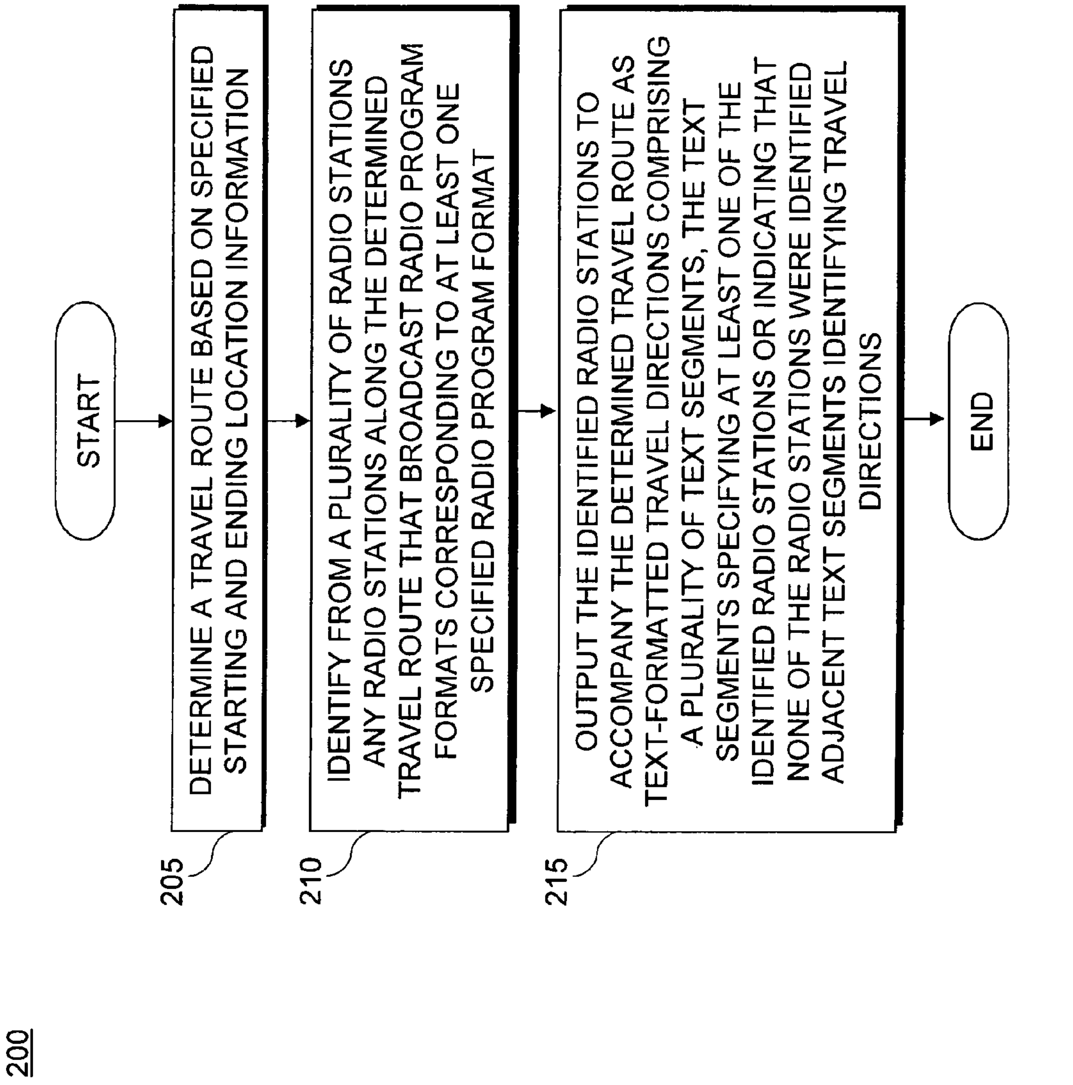
FIG. 2 illustrates an exemplary method for identifying radio stations along a travel route that broadcast specified radio program formats.

FIG. 2 illustrates a method 200 for identifying radio stations along a travel route that broadcast radio program formats corresponding to user-specified radio program format, without requiring positioning devices that provide real-time positioning information of a radio receiver. Not all of the steps of FIG. 2 have to occur in the order shown, as will be apparent to persons skilled in the relevant art(s) based on the teachings herein. Other operational and structural embodiments will be apparent to persons skilled in the relevant art(s) based on the following discussion. These steps are described in detail below. It should be noted that, in accordance with an aspect of the present disclosure, the method 200 illustrated in FIG. 2 can be employed in conjunction with a computer-based system, where the method can be implemented in hardware, software, firmware, or combinations thereof.

In step 205, a travel route can be determined based on specified starting and ending location information. For example, the trip mapping tool 115, shown in the embodiment of FIG. 1, can be configured to determine the travel route based on the starting and ending location information specified by the user and transmitted over the communications network 110.

In step 210, any radio stations along the determined travel route that broadcast radio program formats corresponding to at least one specified radio program format are identified from a plurality of radio stations. For example, the radio station identification tool 120, shown in the embodiment of FIG. 1, can be configured to identify any radio stations along the determined travel route, which was generated by the trip mapping tool 115, that broadcast radio program formats corresponding to at least one radio program format, which was specified by the user and transmitted over the communications network 110.

Step 210 includes analyzing predetermined radio station information compiled for the plurality of radio stations to identify the radio stations along the determined travel route. In one embodiment, the radio station information includes transmitter location information, transmitter coverage area information, program format information, and programming restrictions information. For example, the radio station identification tool 120, shown in the embodiment of FIG. 1, can be configured to analyze the predetermined radio station information compiled for the plurality of radio stations and stored in the radio station information database 125.

In step 215, the identified radio stations are output to accompany the determined travel route as text-formatted travel directions comprising a plurality of text segments. The text segments specify at least one of the identified radio stations, or indicate that none of the radio stations were identified, adjacent to text segments identifying travel directions. For example, as shown in the embodiment of FIG. 5, the exemplary text-formatted travel directions 500 include text segments specifying the identified radio stations (e.g., text segments 505, 520 and 540) adjacent to text segments specifying the travel directions (e.g., text segments 510, 515, 530 and 550). Additionally, the text-formatted travel directions 500 include text segments (e.g., text segment 545) indicating that no radio stations have been identified for particular text segments of the determined travel route (e.g., text segment 550).

In an embodiment, step 215 includes providing information about products available for purchase by the user when no radio stations have been identified. These products can include programs in the at least one radio program format specified by the user. For example, when implemented on an interactive device, the text segment indicating that no radio stations have been identified for a given driving segment can include a hypertext link to an on-line store. In the embodiment of FIG. 5, the text segment 545 includes a hypertext link to an on-line "Music Store." The on-line store can be configured to offer products that can be purchased by the user including, for example, compact discs, digital video discs, and/or downloadable multimedia files containing programs in the user-specified radio program format(s), as shown in the exemplary music store graphical user interface 600 illustrated in FIG. 6.

In another embodiment, step 215 includes outputting the identified radio stations to accompany the determined travel route as graphically-formatted travel directions. The identified radio stations can be represented on a map of the determined travel route based on predetermined transmitter location and transmitter coverage area information for the identified radio stations. For example, the graphically-formatted travel directions 400, illustrated in FIG. 4, represent seven radio stations as circular transmitter coverage areas superimposed on a map of the determined travel route. The underlying map was generated using the MapQuest service for this example. In the embodiment of FIG. 4, the circular transmitter coverage areas are centered on the transmitter locations for the identified radio stations, and the sizes of the circular transmitter coverage areas correspond to the predetermined transmitter coverage areas for the identified radio stations, and can be GUIs, as explained above. While the illustrated coverage areas in the graphically-formatted travel directions 400, shown in FIG. 4, are identified by numbers that correspond to the numbers identifying the radio stations in the text-formatted travel directions 500, shown in FIG. 5, the illustrated coverage areas can also be identified by other indicia, such as radio station identifiers and radio program format, for example.

Optionally, the method 200 can include the additional step of providing the identified radio stations, corresponding transmitter locations and corresponding coverage area data to a user device, for example, which is capable of selectively displaying the text segments.

The present invention has been described with reference to several exemplary embodiments, however, it will be apparent to persons of skill in the relevant art(s) that it is possible to embody the invention in specific forms other than those of the exemplary embodiments described above. This may be done without departing from the scope of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for identifying radio stations broadcasting along a travel route, comprising:

determining a travel route, inside a centralized processor device, based on specified starting and ending location information;

identifying from a plurality of radio stations, from a radio station information database, any radio station along the determined travel route that broadcast radio program formats corresponding to at least one specified radio program format, wherein the identifying includes analyzing predetermined radio station information compiled for the plurality of radio stations; and outputting text-formatted travel directions comprising a plurality of text segments specifying travel segments between said specified starting location and said specified ending location along said travel route, and outputting the identified radio stations, from the radio station information database through a communications network to an end-user device, to accompany the determined travel route as text-formatted travel directions comprising a plurality of text segments, the text segments specifying at least one of the identified radio stations or indicating that none of the radio stations were identified adjacent text segments identifying travel directions, wherein the determining, analyzing and outputting steps are implemented without requiring positioning devices that provide real-time positioning information of a radio receiver, and wherein the travel directions and the accompanying identified radio stations are output to facilitate a traveler's travel from the specified starting point to the ending location prior to said travel.

2. The method of claim 1, wherein the analyzing predetermined radio station information comprises:

analyzing, inside the centralized processor device, at least one of radio station transmitter location information, radio station transmitter coverage area information, radio station program format information, and radio station programming restrictions information.

3. The method of claim 1, wherein the indicating that none of the radio stations were identified comprises:

providing information about products available for purchase through the communications network, wherein the products comprise programs in the specified at least one radio program format.

4. The method of claim 1, wherein the outputting comprises:

outputting the identified radio stations to the end-user device, to accompany the determined travel route as graphically-formatted travel directions, wherein the identified radio stations are represented on a map of the determined travel route based on predetermined transmitter location information and transmitter coverage area information for the identified radio stations.

5. A system for identifying radio stations broadcasting along a travel route, comprising:

a trip mapping tool configured to determine a travel route based on specified staring and ending location information; and a radio station identification tool configured to identify from a plurality of radio stations any radio stations along the determined travel route that broadcast radio program formats corresponding to at least one specified radio program format by analyzing predetermined radio station information compiled for the plurality of radio stations, wherein the trip mapping tool is configured to output text-formatted travel directions comprising a plurality of text segments specifying travel segments between said specified starting location and said specified ending location along said travel route, and output the identified radio stations to accompany the determined travel route as text-formatted travel directions comprising a plurality of text segments, the text segments specifying at least one of the identified radio stations or indicating that none of the radio stations were identified adjacent text segments identifying travel directions, and wherein the trip mapping tool and the radio station identification tool are implemented without requiring positioning devices that generate real-time positioning information of a radio receiver, and wherein the travel directions and the accompanying identified radio stations are output to facilitate a traveler's travel from the specified starting point to the ending location prior to said travel.

6. The system of claim 5, wherein the trip mapping tool is configured to enable a user to specify at least one radio program format from a plurality of predefined radio program formats.

7. The system of claim 6, wherein the trip mapping tool is configured to enable the user to rank the specified radio program formats according to user preference.

8. The system of claim 5, wherein the radio station identification tool is configured to analyze at least one of radio station transmitter location information, radio station transmitter coverage area information, radio station program format information, and radio station programming restrictions information.

9. The system of claim 5, wherein the trip mapping tool is configured to provide information about products that can be purchased when none of the radio stations were identified.

10. The system of claim 9, wherein the products comprise programs in the specified at least one radio program format and include at least one of compact discs, digital versatile discs, and downloadable multimedia files.

11. The system of claim 5, wherein the trip mapping tool is configured to output the identified radio stations to accompany the determined travel route as graphically-formatted travel directions, wherein the identified radio stations are represented on a map of the determined travel route based on predetermined transmitter location information and transmitter coverage area information for the identified radio stations.

12. The system of claim 5, comprising:

a database configured to store the predetermined radio station information compiled for the plurality of radio stations, wherein the radio station identification tool is configured to access the database to perform the analysis.

* * * * *